(12) United States Patent
Bauer et al.

(10) Patent No.: US 11,312,202 B2
(45) Date of Patent: Apr. 26, 2022

(54) HYDRAULIC SYSTEM, HYDRAULIC UNIT, VEHICLE, METHOD AND USE

(71) Applicant: ARGO-HYTOS GROUP AG, Baar (CH)

(72) Inventors: Wolfgang Bauer, Weinheim (DE); Nicolas Groo, Theding (FR); Sebastian Fellhauer, Östringen (DE)

(73) Assignee: ARGO-HYTOS GROUP AG, Baar (CH)

( * ) Notice: Subject to any disclaimer, the term of this patent is extended or adjusted under 35 U.S.C. 154(b) by 0 days.

(21) Appl. No.: 17/057,878

(22) PCT Filed: May 28, 2019

(86) PCT No.: PCT/EP2019/063831
§ 371 (c)(1),
(2) Date: Nov. 23, 2020

(87) PCT Pub. No.: WO2019/229068
PCT Pub. Date: Dec. 5, 2019

(65) Prior Publication Data
US 2021/0197639 A1    Jul. 1, 2021

(30) Foreign Application Priority Data
May 29, 2018    (DE) .................... 10 2018 112 835.5

(51) Int. Cl.
*B60G 17/044*    (2006.01)
*B60G 17/056*    (2006.01)
(Continued)

(52) U.S. Cl.
CPC ....... *B60G 17/044* (2013.01); *B60G 17/0565* (2013.01); *F15B 13/022* (2013.01);
(Continued)

(58) Field of Classification Search
CPC . B60G 17/044; B60G 17/048; B60G 2500/30
See application file for complete search history.

(56) References Cited

U.S. PATENT DOCUMENTS 2,970,831 A * 2/1961 Wordsworth .......... B60G 17/04
267/256
4,702,490 A * 10/1987 Yamaguchi ........ B60G 17/0152
267/64.16
(Continued)

FOREIGN PATENT DOCUMENTS

CN    105782140 A    7/2016
DE    102015219091 A1    4/2017
(Continued)

OTHER PUBLICATIONS

Office Action issued in Chinese Patent Application No. 201910164102. X, dated Jun. 29, 2021, 10 pages.
(Continued)

*Primary Examiner* — James A English
(74) *Attorney, Agent, or Firm* — Hamre, Schumann, Mueller & Larson, P.C.

(57) ABSTRACT

The invention relates to a hydraulic system for controlling or regulating a hydraulic cylinder comprising—at least one hydraulic cylinder, at least one hydraulic unit by means of which the hydraulic cylinder can be optionally connected to a pressure source and a tank and at least one control or regulating device for controlling or regulating the supply of hydraulic fluid to the hydraulic cylinder, the control or regulating device forms a first assembly and the hydraulic unit forms a second assembly which are structurally separate from one another and fluidically connected, wherein the supply of hydraulic fluid to the hydraulic cylinder can be predominantly controlled or regulated by the control or regulating device from outside the hydraulic unit and
(Continued)

wherein the hydraulic unit is rigidly fastened on the hydraulic cylinder.

18 Claims, 1 Drawing Sheet

(51) Int. Cl.
 *F15B 13/02* (2006.01)
 *B66F 9/075* (2006.01)
(52) U.S. Cl.
 CPC .. *B60G 2202/413* (2013.01); *B60G 2202/416* (2013.01); *B60G 2300/022* (2013.01); *B60G 2500/30* (2013.01); *B66F 9/07586* (2013.01)

(56) References Cited

U.S. PATENT DOCUMENTS

| | | | |
|---|---|---|---|
| 5,351,790 | A | 10/1994 | Machida |
| 2006/0037470 | A1 | 2/2006 | Stingl |
| 2007/0170680 | A1 | 7/2007 | Knaap |
| 2008/0202875 | A1 | 8/2008 | Siebeneick |
| 2017/0240019 | A1* | 8/2017 | Six ................... B60G 17/0416 |
| 2018/0274526 | A1* | 9/2018 | Guender ............... F15B 21/044 |

FOREIGN PATENT DOCUMENTS

| | | |
|---|---|---|
| DE | 102015225436 A1 | 6/2017 |
| DE | 102017103915 A1 | 8/2017 |
| EP | 0193124 A2 | 9/1986 |
| EP | 1067296 A1 | 1/2001 |
| EP | 1628020 A2 | 2/2006 |
| EP | 1791705 B1 | 6/2012 |
| GB | 2547479 A | 8/2017 |
| JP | 2000264034 A | 9/2000 |

OTHER PUBLICATIONS

International Search Report (with English translation) and Written Opinion issued in PCT/EP2019/063831, dated Sep. 6, 2019, 17 pages provided.

Office Action issued in corresponding Chinese Application No. CN201910164102.X, dated May 6, 2020, with English machine translation; 19 pages provided.

Office Action issued in corresponding German Application No. 10 2018 112 835.5, dated Jan. 15, 2019, 10 pages provided.

* cited by examiner

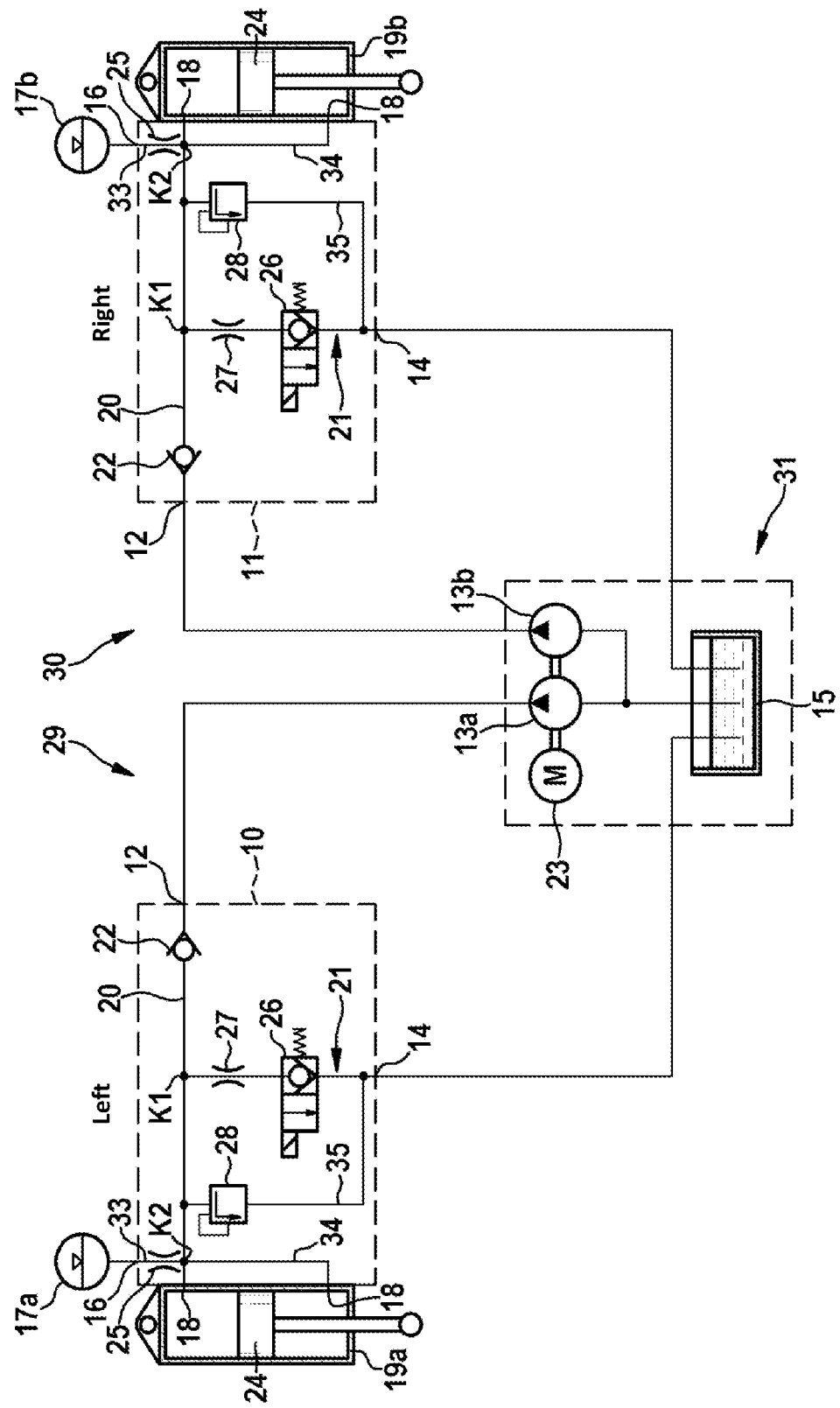

HYDRAULIC SYSTEM, HYDRAULIC UNIT, VEHICLE, METHOD AND USE

The invention relates to a hydraulic system for controlling or regulating a hydraulic cylinder. A hydraulic system of this type is known, for example, from EP 1 067 296 A1. The invention further relates to a hydraulic unit, a vehicle, a method and a use of the hydraulic unit.

The known hydraulic system is used in self-propelled forklift trucks which are to be operated in an energy-saving manner. A load-dependent pressure potential of the hydraulic fluid is used for this purpose. The known hydraulic system is concerned with the problem that a second supply pump is provided for actuating a consumer for an auxiliary function. In order to control the auxiliary functions, the known hydraulic cylinder has a complex control circuit, which results in throttle losses.

It is the object of the invention to provide a hydraulic system for controlling or regulating a hydraulic cylinder which has a simple, compact and secure structure. In addition, the hydraulic system should be suitable for electric-drive vehicles. It is further the object of the invention to provide a hydraulic unit, a vehicle, a method and the use of the hydraulic unit.

Specifically the object is solved by a hydraulic system for controlling or regulating a hydraulic cylinder comprising—at least one hydraulic cylinder and at least one hydraulic unit. The hydraulic cylinder can optionally be connectable to a pressure source and a tank by the hydraulic unit. The hydraulic system comprises at least one control or regulating device for controlling or regulating the supply of hydraulic fluid to the hydraulic cylinder. The control or regulating device forms a first assembly. The hydraulic unit forms a second assembly. The first and second assembly are structurally separate from one another and fluidically connected. The supply of hydraulic fluid to the hydraulic cylinder can be predominantly controlled or regulated by the control or regulating device from outside the hydraulic unit. The hydraulic unit is rigidly fastened on the hydraulic cylinder.

The invention has the advantage that the hydraulic device has a simple and compact structure and is secure against hose rupture. As a result of the simple structure and the division into hydraulic unit and control or regulating device, throttle losses during the raising process which in the prior art are caused by the control units usually integrated in the hydraulic unit are avoided. The control units are not required or only to a lesser extent in the invention. To this end, it is provided according to the invention that the two assemblies formed by the control or regulating device and the hydraulic unit are structurally separate from one another. The structural separation can for example be achieved by a spatial separation and mechanical delimiting of the assemblies. To this end the two assemblies can, for example, be accommodated in different, spatially separate, in particular spaced apart, housings. The assemblies form mechanically separate structural units which can be handled independently of one another, in particular which can be mounted independently of one another.

The hydraulic system according to the invention is space-saving and enables a flexible use of the available installation space because a simple control and regulating device can be accommodated centrally which is connected to one or more small simple hydraulic units which are mounted in a decentralized manner on the hydraulic cylinders. This avoids the fact that a larger installation space needs to be prepared at a single position of the vehicle. The hydraulic units can each be fitted with pressure storage devices for the suspension.

For the control or regulating function the two assemblies are fluidically connected to one another. This is accomplished, for example, by lines which interconnect the two structurally separate assembles. In other words, the two assemblies are on the one hand mechanically separate from one another and on the other hand fluidically connected to one another. In this case, the hydraulic unit is primarily responsible for the control/regulation of the outflow of hydraulic fluid from the hydraulic cylinder and the control and regulating devices are primarily responsible for the control/regulation of the inflow of hydraulic fluid to the hydraulic cylinder. According to the invention, it is therefore provided that the supply of hydraulic fluid to the hydraulic cylinder can predominantly be controlled or regulated from outside the hydraulic unit by the control or regulating device.

It is sufficient if the supply of hydraulic fluid to the hydraulic cylinder is predominantly controlled or regulated from outside the hydraulic unit. A maximum reduction in the throttle losses is achieved if the supply of hydraulic fluid, i.e. the lifting process is completely controlled or regulated from outside the hydraulic unit, wherein safety units, for example, a check valve can be integrated in the hydraulic unit. In extreme cases, the entire control or regulation of the supply is external. This means that in extreme cases at least one lifting branch of the hydraulic unit, i.e. the region of the hydraulic unit provided for the supply of the hydraulic fluid, is free from switching members, control members and regulating members.

Other regions of the hydraulic unit, for example a lowering branch of the hydraulic unit, which is used for the outflow of the hydraulic fluid has switching members, control members and regulating members for the hydraulic fluid.

Predominantly means that insignificant control activities in the lifting branch of the hydraulic unit, i.e. in the supply of hydraulic fluid to the hydraulic cylinder, are allowed. For example, up to 25%, in particular up to 20%, in particular up to 10%, in particular up to 5% of the supply power for the cylinder stroke can be controlled inside the hydraulic unit. At least 75% of the supply power is controlled or regulated from outside the hydraulic unit by the control or regulating device.

The rigid fastening of the hydraulic unit on the hydraulic cylinder has the advantage that a structural unit of hydraulic unit and hydraulic cylinder which can be handled uniformly is created, which has a robust, simple and particularly safe structure because flexible hose connections can be dispensed with between the hydraulic cylinder and the hydraulic unit. As a result safety against hose breakage is achieved. In a preferred embodiment the rigid fastening of the hydraulic unit on the hydraulic cylinder is achieved by arranging the hydraulic unit directly on the hydraulic cylinder and fluidically connecting to this. This reliably eliminates a hose breakage at this point. It is also possible that the hydraulic unit is spaced apart from the hydraulic cylinder by a gap and the fluid connection is made by fixed pipe pieces which bridge the gap.

The structural unit of hydraulic unit and hydraulic cylinder is mounted together and dismounted together or exchanged for maintenance purposes. The structurally separate control or regulating device is provided at a different spatial position of the hydraulic system.

The invention has the further advantage that the structurally separate control or regulating device can be coupled and operated with an electrical drive of the vehicle.

Preferred embodiments of the invention are specified in the subclaims.

Thus the pressure source preferably comprises at least one switchable or controllable or regulatable fluid source. The fluid source is part of the control or regulating device to form a displacer control or regulation of the hydraulic cylinder. For energy reasons the hydraulic power is preferably displacer-controlled, i.e. without using throttle devices for controlling the volume flow.

In the case of displacer control or displacer regulation, the hydraulic power is controlled or regulated by switching on or adjusting the fluid source. The hydraulic power can be varied by the fluid source, in particular can be varied or switched continuously, i.e. can be switched on and off. For switching the hydraulic power it is possible to use a constant pump, i.e. a non-adjustable pump, which is switched on or off. By providing the hydraulic power as required, a high efficiency is achieved. The pressure losses which occur during resistance control by valves are avoided.

The use of a constant pump as fluid source is particularly preferred to obtain a simple system in which the lifting process is accomplished with low throttle losses and a high safety against hose breakage is achieved.

In a further preferred embodiment the fluid source is drive-connected to an electric motor on the one hand and on the other hand is fluidically connected to the hydraulic cylinder by the hydraulic unit for control or regulation of the supply of hydraulic fluid to the hydraulic cylinder. This embodiment is particularly suitable for superordinate systems which have an electrical power provision source as the main power source for the driving and working functions such as, for example, electric-drive vehicles. Various possibilities are feasible here. The electric motor can be supplied by a battery and/or connected to a generator which is operated by an internal combustion engine.

Preferably a backflow of hydraulic fluid at the hydraulic cylinder to the fluid source is prevented by a valve, which is integrated in the hydraulic unit. The valve, for example a non-return valve has the advantage that in the event of a line break between the control or regulating device and the hydraulic unit, no hydraulic fluid can escape from the hydraulic unit or the escape is limited. The valve is therefore a safety means.

Preferably the electric motor can be throttled down in such a manner to limit the power that the maximum displacer conveying pressure can be limited. This avoids any damage to the system by excess pressures.

For the displacer regulation the electric motor can be a frequency-regulated electric motor with variable rotational speed.

The control or regulating device can comprise means for dividing power, for example a flow divider and/or a valve control or regulating with at least one controlling or regulating valve. In this case, variable hydraulic resistances (valves) are used to control or distribute the hydraulic power.

In a particularly preferred embodiment, the hydraulic system comprises a hydropneumatic suspension system for regulating the level of a vehicle having at least one pressure storage device which is fluidically connected to the hydraulic cylinder. This embodiment is particularly suitable for the suspension of vehicles which have an electrical power provision source as the main power source for the driving and working functions.

Hydropneumatic suspensions are usually used in machines on which a hydraulic supply is already provided in any case. In the case of machines on which no hydraulics but instead a pneumatic supply is provided (e.g. for a braking system), the suspension is usually pneumatic, i.e. designed with air suspension bellows. This is the case for example with lorries and coaches. In some vehicles, pneumatic suspensions are reaching their limits, e.g. with increasing axle loads, roll stability, possible regulating speed or also in the case of energy consumption. Inter alia due to the electrification of vehicle drives, the requirements relating to load (weight of batteries) and energy consumption increase. As a result, particularly in heavy electric vehicles, hydropneumatic suspensions are coming to the fore, all the aforesaid properties can be fulfilled very well here.

Due to the structural and functional separation of the hydraulic unit and the control or regulating device, this embodiment can be coupled particularly well to the electric motor in order to provide the hydraulic power required for regulating the level of the vehicle. In this embodiment it is a question of a long-term height regulation by the hydraulic cylinder to compensate for load variations. Therefore it is not a question of a particular dynamics and a good response behaviour of the regulation. On the contrary, a hydropneumatic suspension and position regulation is provided, which is cost-effective, energy-efficient and safe and can be accommodated in a space-saving manner in the vehicle. In future the (partial) omission of the hydraulics from these vehicles should be expected in the course of the electrification of vehicles and functions. This embodiment takes account of this development and then still enables hydropneumatic suspensions.

In a further particularly preferred embodiment at least two position regulating circuits are provided which each comprise a hydraulic unit, respectively one hydraulic cylinder and optionally respectively one pressure storage device. Both position regulating circuits are coupled to a common drive unit. The drive unit comprises an electric motor (23), which is connected to a single fluid source, for example a single pump, or to a multiple fluid source for the two load regulating circuits, for example with several pumps having a common drive shaft. This embodiment is particularly suitable for the suspension of a vehicle axle with two wheel suspensions, wherein the suspension is accomplished by a hydropneumatic suspension system, in particular by a suspension system according to the preceding embodiment. The suspension of a vehicle axles with two wheel suspensions can also be accomplished with a single pump, for example a constant pump, for both wheel suspensions. A flow divider downstream of the pump can be provided for the power distribution to the wheel suspensions. The power distribution can also be accomplished in a different manner. It is also possible to provide a plurality of, in particular two electric motors, which are each drive-connected to their own fluid source and supply the position regulating circuits separately with hydraulic fluid.

In one further embodiment the hydraulic unit comprises the following components:
at least one first connection for a fluid source,
at least one second connection for a tank,
optionally at least one third connection for a pressure storage device,
at least one fourth connection for a hydraulic cylinder;

The hydraulic unit comprises a lifting branch between the first connection and the fourth connection for supplying hydraulic fluid to the hydraulic cylinder. The hydraulic unit further comprises a lowering branch between the second connection and the fourth connection for removing hydraulic fluid from the hydraulic cylinder.

The lowering branch preferably branches off from the lifting branch or is fluidically connected to this. The region between the branch and the fourth connection or generally between the branch and the hydraulic cylinder temporarily connects the lifting branch to the hydraulic cylinder and temporarily connects the lowering branch to the hydraulic cylinder, specifically to the fourth connection depending on whether the lifting process or the lowering process takes place. This region, also called connecting branch, has hydraulic oil flowing through it in different directions.

This embodiment forms a possibility of implementing the previously explained suspension system. Other embodiments are also possible.

Preferably the fourth connection comprises a double connection for a piston side and a rod side of a double-acting hydraulic cylinder with a piston. The hydraulic unit is therefore particularly compact.

If a flow-influencing element, in particular a screen or a throttle is arranged between the third connection and the fourth connection, the volume flow between these two connections is impeded and thereby loses flow energy, with the result that the spring movement is damped.

The lowering branch can have switching elements and/or regulating elements for varying the removal of hydraulic fluid from the hydraulic cylinder. The lowering rate of the hydraulic cylinder is thereby influenced. For clarification it is pointed out that the structural and functional separation between hydraulic unit and control and regulating device relates to the lifting function of the hydraulic cylinder. This does not eliminate the fact that the hydraulic unit has switching elements or regulating elements which relate to the lowering function of the hydraulic cylinder.

The lowering branch can have at least one switching valve, in particular a proportional poppet valve, in particular a corresponding valve as a 2/2 way valve. The lowering branch can have at least one flow-influencing element, in particular a throttle and/or at least one pressure-limiting valve and/or at least one proportional poppet valve and/or at least one flow regulator.

Preferably the hydraulic cylinder is mechanically rigidly connected to a wall of the hydraulic unit. In this case, the hydraulic cylinder can rest directly on the wall of the hydraulic unit. Alternatively a gap can be formed between the wall of the hydraulic unit and the hydraulic cylinder.

If the hydraulic cylinder rests directly on the wall of the hydraulic unit, the fourth connection, in particular the double connection, can be directly fluidically connected via this wall to the hydraulic cylinder. This embodiment is particularly advantageous because flexible hose connections and therefore the risk of hose breakage between the hydraulic cylinder and the hydraulic unit is reliably avoided. If a gap is formed between the hydraulic cylinder and the wall of the hydraulic unit, this gap can be bridged by a rigid pipe piece.

In addition to the hydraulic system, a hydraulic unit for a hydropneumatic suspension system for regulating the level of a vehicle is also claimed as part of the invention. Thus, the unit as such, that is independently of the hydraulic cylinder and further components of the suspension system or general hydraulic system, is disclosed and claimed. The hydraulic unit has the same connections as the aforesaid embodiment of the hydraulic system. In addition, the hydraulic unit is characterized in that the lifting branch, in particular the lifting branch and a connecting branch between the lifting branch and the fourth connection is substantially free from switching and regulating elements for varying the supply of hydraulic fluid to the hydraulic cylinder.

The hydraulic unit according to the invention has the advantage that this has a simple and compact structure, wherein in the lifting branch, i.e. in connection with the lifting function of the hydraulic cylinder, none or only low throttle losses occur. The control or regulation of the cylinder stroke is accomplished externally by a separate control and regulating device.

Other regions of the hydraulic unit, for example the lowering branch can have switching and regulating elements.

The hydraulic unit according to the invention is disclosed and claimed as such and in connection with the hydraulic system. Here it is pointed out that the hydraulic unit in connection with the hydraulic system according to the invention is a preferred embodiment to which the hydraulic system is not restricted. Other hydraulic units can be used with the hydraulic system according to the invention.

The method according to the invention for regulating the level of a vehicle uses the hydraulic system described herein. In the method the vehicle is raised by regulating a fluid source in which the electric motor is activated, wherein during raising substantially the same pressure is applied to the fluid source and to the hydraulic cylinder. This has the advantage that almost no throttle losses occur during lifting of the hydraulic cylinder.

Preferably in the case of a plurality of fluid sources one fluid source is made ineffective by opening the lowering branch and thereby an oil circulation. As a result, individual consumers or hydraulic cylinders can be activated separately.

The invention will be explained in detail by means of an exemplary embodiment with reference to the appended schematic drawing with further details.

In this the single FIGURE shows a circuit diagram of a hydraulic system according to an exemplary embodiment of the invention.

The exemplary embodiment of a hydraulic system according to the invention shown in the single FIGURE can be used as a suspension system in mobile working machines and specifically for the position regulation of a vehicle axle, wherein the left and right wheel of the axle can be regulated separately. The hydraulic system is suitable for the suspension of vehicles of all types, in particular when no (more) hydraulic supply is provided in these or in which an air suspension is not suitable. The invention is not restricted to the position regulation shown in the single FIGURE. Specifically the depicted hydraulic system can be used as axle suspension or single wheel suspension. Other suspensions which require a level regulation for example for adapting loading states or for adjusting the ground clearance are possible.

Specifically the hydraulic system comprises two position regulating circuits 29, 30 which are constructed accordingly. The position regulating circuits 29, 30 can be constructed differently. The invention is not restricted to a two-circuit system but can have a single position regulating circuit or more than two position regulating circuits, for example, three, four or more position regulating circuits. The following explanations in relation to the first position regulating circuit 29 apply similarly for the second position regulating circuit 30 or all further position regulating circuits. With regard to the reference numbers of corresponding components of the position regulating circuits, reference is made to the reference list.

The position regulating circuit 29 or generally the hydraulic system 10 has a hydraulic cylinder 19*a*. A hydraulic unit 10 is fastened rigidly, for example screwed or welded on the hydraulic cylinder 19*a*. The hydraulic unit is flange-mounted directly to the hydraulic cylinder 19*a*. The hydraulic unit 10 connected rigidly to the hydraulic cylinder 19a and the hydraulic cylinder 19a form a fixed structural unit.

The hydraulic unit 10 has the function of connecting the hydraulic cylinder 19a optionally to a pressure source or a tank 15. The rigid fastening of the hydraulic unit 10 on the hydraulic cylinder 19a increases the safety of the system since as a result of the directly flange-mounted hydraulic unit 10, the suspension circuit is closed and therefore a hose or pipe breakage has no effects on the suspension properties.

The position regulating circuit 29 or generally the hydraulic system 10 has a control or regulating device 31 which serves to control or regulate the supply of hydraulic fluid to the hydraulic cylinder 19a. If for the sake of simplicity hereinafter there is talk of a regulation, this also covers a control.

The control or regulating device 31 forms a first assembly and is characterized by a dashed system boundary. The hydraulic unit 10 is also characterized by a dashed system boundary which delimits a second assembly from the first assembly. The system boundary means that the control or regulating device 31 is not only functionally separated from the hydraulic unit 10 but also that the two assemblies are structurally separate from one another. The control or regulating device 31 is located at another spatial position of the hydraulic system or the position regulating circuit 29 and is mechanically dependent on the hydraulic unit 10.

As can be seen in the single FIGURE, the two assemblies, i.e. the hydraulic unit 10 and the control or regulating device 31 are fluidically connected by a line, in particular pipeline or by a hose connection. The supply of hydraulic fluid to the hydraulic cylinder 19a is regulated by this fluid connection. The regulation of the supply is predominantly accomplished from outside the hydraulic unit 10 by the control or regulating device 31. In other words, the pressurized delivery volume required for the stroke of the hydraulic cylinder 19a is provided by the control or regulating device 31. The hydraulic system is constructed according to the displacer principle, wherein the control or regulating device 31 for upregulating the position, i.e. for raising the hydraulic cylinder 19a, conveys hydraulic fluid into the hydraulic cylinder 19a. Thus, substantially the entire energy used is converted into mechanical energy so that the hydraulic system operates very energy-efficiently. As can be seen in the single FIGURE, the hydraulic system completely dispenses with valves for upregulating. Instead the control or regulating device 31 is used for upregulating.

To this end the control or regulating device 31 has a switchable or controllable or regulatable fluid source 13a.

The fluid source 13a is drive-connected on the one hand to an electric motor 23. On the other hand the fluid source 13a is fluidically connected to the hydraulic unit 10 so that the hydraulic power by means of which the hydraulic cylinder 19a is supplied with hydraulic fluid via the hydraulic unit 10 can be regulated by an activation (on/off or variable) of the electric motor 23.

The switchable fluid source 13a can for example be a constant pump, i.e. a pump having a constant displacement per revolution. The switchability of the fluid source 13a is usually achieved by a drive member which is connected to the fluid source 13a, for example, by the electric motor 23. In this case, the electric motor 23 connected to the constant pump is switched on and off for the lifting process. Alternatively the constant pump can be coupled to the electric motor 23 as required by a coupling. Other possibilities are feasible.

The electric motor 23 can be designed as a frequency-regulated electric motor with variable rotational speed so that the lifting speed of the hydraulic cylinder 19a is adjustable. The electric motor 23 has a power/torque limitation to limit the maximum displacer delivery pressure. The pump is accordingly adapted to the electric motor 23.

Instead of the previously described displacer regulation, the hydraulic power can be provided by a resistance regulation which comprises corresponding regulating valves. Here it also applies that the control or regulating device constructed according to the principle of resistance regulation (not depicted) is structurally separate from the hydraulic unit 10.

The hydraulic unit 10 is constructed as follows:

The hydraulic unit 10 forms a hydraulic block with a first connection 12 which is connected or can be connected to the fluid source 13a, specifically to the electric-motor driven pump. The hydraulic unit 10 has a second connection 14, which is fluidically connected or can be fluidically connected to a tank 15. The tank 15 belongs to the first assembly of the control or regulating device 31. Alternatively a common tank together with other systems could be used. A third connection 16 of the hydraulic unit 10 is connected or can be connected to a pressure storage device 17a, for example a membrane storage device. Such pressure storage devices are known per se.

A fourth connection 18 is connected to the hydraulic cylinder 19a. As can be seen in the single FIGURE, the fourth connection 18 is connected directly to the hydraulic cylinder, i.e. without interposed hose connections. To this end the hydraulic unit 10 is directly or generally rigidly connected to a wall of the hydraulic cylinder 19, wherein the fourth connection 18 is made directly via the wall. This is shown in the single FIGURE whereby the system boundary (dashed line) of the hydraulic unit 10 coincides with the wall of the hydraulic cylinder 19.

The fourth connection 18 is designed as a double connection which on the one hand is connected to the piston side and on the other hand is connected to the rod side of the hydraulic cylinder 19a. The rod side or piston side is obtained from the arrangement of the piston 24 in the hydraulic cylinder 19a. The piston 24 can be part of a double-acting hydraulic cylinder. Other pistons or cylinders are possible, for example a plunger cylinder. In the double-acting hydraulic cylinder a different pressure can prevail in the annular space, for example, as a result of a hydraulically pre-tensioned suspension.

The hydraulic unit 10 comprises a lifting branch 20 and a lowering branch 21 as well as optionally further branches with different functions, for example, a suspension branch 33, a connecting branch 34 and a pressure-limiting branch 35.

The lifting branch 20 comprises those lines or channels of the hydraulic unit 10 through which the hydraulic oil flows exclusively to the hydraulic cylinder 19a. The direction of flow is accomplished in a single direction to the hydraulic cylinder 19a. The hydraulic cylinder 19a is supplied with hydraulic fluid through the lifting branch 20 and subjected to pressure so that this cylinder can execute the lifting function for the position regulation.

The lifting branch 20 specifically comprises the line from the first connection 12, which is connected or can be connected to the fluid source 13a, as far as the first node point K1 at which the lowering branch 21 is fluidically connected to the lifting branch 20 or branches off from the lifting branch 20. As can be seen in the single FIGURE, only the check valve 22 is arranged in the lifting branch which prevents hydraulic fluid escaping from the hydraulic unit 10 if the line or hose connection between the hydraulic unit 10 and the control or regulating device 31 arranged at a distance from this ruptures or leaks. In addition, the lifting branch 20 is free or substantially free from switching elements, regulating elements or control elements for regulating the supply power.

The connecting branch 34 is located downstream of the lifting branch 20 in the flow direction.

The connecting branch 34 comprises those lines or channels of the hydraulic unit 10 which pertain functionally both to the lifting branch 20 and also to the lowering branch 21. The connecting branch 34 is therefore characterized in that the hydraulic fluid flows through the lines or channels of the connecting branch 34 in both directions and specifically in the direction of the hydraulic cylinder 19a during the lifting process and in a direction away from the hydraulic cylinder 19a during the lowering process. The connecting branch 34 comprises those lines through which flow takes place on the one hand during the lifting process in the supply direction, i.e. towards the hydraulic cylinder 19a and on the other hand during the lowering process in the opposite direction, i.e. hydraulic oil guided away from the hydraulic cylinder 19a flows through these lines.

The connecting branch 34 connects both the lifting branch and also the lowering branch 21 to the hydraulic cylinder 19a.

As a result of the at least temporary functional belonging of the connecting branch 34 to the lifting branch 20, the connecting branch 34 can be seen as part of the lifting branch 20. The explanations for the lifting branch 20 also apply for the connecting branch 34. The connecting branch 34 is constructed according to the lifting branch 20. The connecting branch 34 is free, in particular substantially free from switching members or regulating members which significantly influence the hydraulic fluid when this flows to the hydraulic cylinder 19a.

Specifically the connecting branch 34 extends starting from the first node point K1 as far as the fourth connections 18 inclusive, which fluidically connect the hydraulic cylinder 19a to the hydraulic unit 10.

The suspension branch 33 is fluidically connected to the hydraulic cylinder 19a. There are various possibilities for this. For example, the suspension branch 33, as shown in the single FIGURE, is fluidically connected to the second node point K2. The second node point K2 is located in the connecting branch 34. The second node point K2 forms the branch of the lines to the fourth connections 18 or generally to the hydraulic cylinder 19a. It is also possible to connect the suspension branch 33 directly to the hydraulic cylinder 19a or the corresponding working chamber.

The suspension branch 33 comprises a first throttle 25 which is located downstream of the second node point K2. In addition, the suspension branch 33 has a pressure storage device 17a, for example in the form of a membrane storage device. Other pressure storage devices are possible.

The lowering branch 21 comprises those lines or channels through which hydraulic oil removed from the hydraulic cylinder 19a exclusively flows during the lowering process. Flow through the lines of the lowering branch 21 takes place in a single flow direction and specifically in a direction towards the tank 15. The lowering branch 21 has the function of removing or partially removing the hydraulic fluid located in the hydraulic cylinder 19a, i.e. when the hydraulic cylinder 19a is regulated downwards. Switching members or regulating members are provided in the lowering branch 21 to vary the lowering rate of the hydraulic cylinder 19a. Since no electrical energy is supplied during the lowering process, the ensuing throttle losses are less relevant.

Specifically the lowering branch 21 comprises a line starting from the first node point K1 as far as the second connection 14 inclusively, which is connected or can be connected to the tank 15. The lowering branch 21 has a switching valve 26. The switching valve 26 is a proportional poppet valve which regulates the volume flow from the hydraulic cylinder 19a to the tank 15. Other valves are possible.

A second throttle in the flow direction is located upstream of the switching valve 26.

The combination of the switching valve 26 and the second throttle 27 or a screen can be replaced by a suitably dimensioned proportional poppet valve. Instead of the second throttle 27, a flow regulator can also be used, with the result that the removed volume flow is independent of the pressure in the hydraulic cylinder 19a. This has the advantage that then the volume flow can be matched by the flow regulator, e.g. precisely to the volume flow of the pump so that the lowering takes place as rapidly as the lifting. In addition, this has the advantage that during lifting of only one side of the two-circuit system shown in the single FIGURE, the other side (with activated switching valve 26) does not change its position independently of the pressure in the two hydraulic cylinders 19a, 19b.

The pressure-limiting branch 35 comprises a bypass line 32 which connects the connecting branch 34 and the lowering branch 21 avoiding the switching valve 26. Specifically the pressure-limiting branch 35 connects the connecting branch 34 between the two node points K1, K2 to a position of the lowering branch 21 which is located downstream of the switching valve 26. The pressure-limiting branch 35 has a pressure-limiting valve 28 which opens in the case of excessive pressures in the connecting branch 34 in order to protect the hydraulic cylinder 19a from damage. Excessive pressures can occur, for example due to impacts which act on the hydraulic cylinder 19a from outside when travelling over unevennesses. For pressure protection of the supply a pressure-limiting valve can also be provided in the control or regulating device 31 behind the fluid sources 13a, 13b. Other safety measures for protecting the hydraulic cylinder 19a are optionally possible, for example, dispensing with the pressure-limiting valve 28 when the maximum pump delivery pressure is limited by a downward regulation of the electric motor 23 and for example external forces on the hydraulic cylinder 19a are limited.

The exemplary embodiment shown in the single FIGURE is not definitive. Other arrangements are also possible. For example the fluid sources 13a, 13b can consist of only a single pump with a pressure-compensated flow divider.

Apart from the preceding safety elements, the lifting branch 20 is free from switchable or controllable or regulatable actuators. The stroke is thus regulated exclusively by the external control or regulating device 31, i.e. according to the principle of displacer control. It is possible that insignificant control elements are arranged in the lifting branch 20 as long as the regulation of the hydraulic supply to the hydraulic cylinder 19a is predominantly accomplished by the external control or regulating device 31.

The hydraulic system according to the single FIGURE is also cost-effective in that valves for upward regulation, i.e. for extending the hydraulic cylinder 19a are completely dispensed with and instead only the activation of the pump drive (electric motor) is used for this purpose. In this case, a single drive motor or electric motor which drives a single pump, two pumps or a double pump or generally a plurality of pumps can be provided for the activation of two position regulating circuits, with the result that a further electric circuit is saved.

The two position regulating circuits 29, 30 are supplied with hydraulic fluid by a single common control or regulating device 31. The depicted principle can be used for a single position regulating circuit or a plurality of position regulating circuits, for example three, four or more position regulating circuits, wherein a corresponding number of pumps or a corresponding number of divided volume flows is provided. In the present example two pumps are provided which are assigned accordingly to the two position regulating circuits 29, 30. Both pumps are driven jointly by the electric motor 23. Other arrangements are possible.

Hydraulic circuits for the synchronization of the hydraulic cylinders 19a, 19b for example by series connection or coupled hydraulic motors or flow dividers are known. These circuits can be combined with the position regulating circuits 29, 30 and the displacer control. The system is space-saving in that a very simple hydraulic unit is accommodated centrally and is connected to small simple hydraulic units 10, 11 mounted in a decentralized manner on the hydraulic cylinders 19a, 19b in each case with pressure storage devices for the suspension. This avoids the need to provide a larger installation space at one location in the vehicle.

The hydraulic system shown in the single FIGURE functions as follows:

The electric motor 23 is switched on for lifting the vehicle axle. Hydraulic fluid is conveyed into the hydraulic units 10, 11 and specifically in each case through the first connection 12 into the respective lifting branch 20 and connecting branch 34 of the two hydraulic units 10, 11. Through the fourth connection 18 the hydraulic fluid is conveyed from the respective lifting branch 20 via the connecting branch 34 into the hydraulic cylinders 19a, 19b. The pistons 24 are extended for lifting the vehicle or the vehicle axle.

For lowering the vehicle axle the two switching valves 26 are energized and opened according to the desired switching position. Depending on the switching position of the two switching valves 26 a corresponding volume flow is returned via the connecting branch 34 through the lowering branch 21 via the second connection 14 into the tank 15. The pistons are retracted and the vehicle axle lowered.

If only the right wheel is to be raised, the electric motor 23 is switched on and the left switching valve 26 energized. If only the left wheel is to be raised, the electric motor 23 is switched on and conversely the right switching valve 26 is energized. Generally for raising only a first wheel or only a first side the respective lifting function of the other second wheel or the other second side is made ineffective by opening the lowering branch 21 of the hydraulic unit 10, 11 of the second wheel or the second side.

If only the left wheel or only the left side is to be lowered, only the left switching valve 26 is energized or conversely when lowering only the right wheel or only the right side the right switching valve 26 is energized.

REFERENCE LIST

10, 11 Hydraulic unit
12 First connection
13a, 13b Fluid source
14 Second connection
15 Tank
16 Third connection
17a, 17b Pressure storage device
18 Fourth connection
19a, 19b Hydraulic cylinder
20 Lifting branch
21 Lowering branch
22 Valve
23 Electric motor
24 Piston
25 Second throttle
26 Switching valve
27 First throttle
28 Pressure-limiting valve
29, 30 Position regulating circuit
31 Control or regulating device
32 Bypass line
33 Suspension branch
34 Connecting branch
35 Pressure-limiting branch
K1 First node point
K2 Second node point

The invention claimed is:

1. A hydraulic system comprising:
a first hydraulic cylinder;
a first hydraulic unit by means of which the first hydraulic cylinder can be connected to a control or regulating device for controlling or regulating the supply of hydraulic fluid to the first hydraulic cylinder, the control or regulating device includes a pressure source and a tank; and
wherein the control or regulating device forms a first assembly and the first hydraulic unit forms a second assembly, the first assembly and the second assembly are structurally separate from one another and fluidically connected, wherein supply of hydraulic fluid to the first hydraulic cylinder is controlled or regulated by the control or regulating device from outside the first hydraulic unit and wherein the first hydraulic unit is rigidly fastened on the first hydraulic cylinder;
the first hydraulic unit includes a first connection to the control or regulating device, a second connection to the tank of the control or regulating device, optionally a third connection to a pressure storage device, a fourth connection to the first hydraulic cylinder, a lifting branch between the first connection and the fourth connection for supplying hydraulic fluid to the first hydraulic cylinder, and a lowering branch between the second connection and the fourth connection for removing hydraulic fluid from the first hydraulic cylinder;
the first hydraulic cylinder is mechanically rigidly fastened to a wall of the first hydraulic unit;
the fourth connection is directly fluidically connected via the wall of the first hydraulic unit to the first hydraulic cylinder.

2. The hydraulic system according to claim 1, wherein the pressure source comprises at least one switchable or controllable or regulatable fluid source.

3. The hydraulic system according to claim 2, wherein the fluid source is drive-connected to an electric motor and is fluidically connected to the first hydraulic cylinder by the first hydraulic unit.

4. The hydraulic system according to claim 3, wherein the first hydraulic unit includes a valve that prevents backflow of hydraulic fluid from the first hydraulic cylinder to the fluid source.

5. The hydraulic system according to claim 3, wherein the electric motor can be throttled to limit power.

6. The hydraulic system according to claim 3, wherein the electric motor is a frequency-regulated electric motor with variable rotational speed.

7. The hydraulic system according to claim 1, wherein the hydraulic system comprises a hydropneumatic suspension system for regulating the level of a vehicle, and the hydraulic system includes a pressure storage device which is fluidically connected to the first hydraulic cylinder.

8. The hydraulic system according to claim 1, comprising first and second position regulating circuits; the first position regulating circuit includes the first hydraulic cylinder and the first hydraulic unit; the second position regulating circuit includes a second hydraulic cylinder and a second hydraulic unit; the first and second position regulating circuits are coupled to the control or regulating device which comprises an electric motor.

9. The hydraulic system according to claim 1, wherein the first hydraulic cylinder includes a double-acting hydraulic cylinder with a piston, and the fourth connection comprises a connection to a piston side of the first hydraulic cylinder and a connection to a rod side of the first hydraulic cylinder.

10. The hydraulic system according to claim 1, further comprising the third connection, and a flow-influencing element arranged between the third connection and the fourth connection.

11. The hydraulic system according to claim 1, wherein the lowering branch has a switching element and/or a regulating element for varying the removal of hydraulic fluid from the first hydraulic cylinder.

12. The hydraulic system according to claim 1, wherein the lowering branch has at least one switching valve.

13. The hydraulic system according to claim 1, wherein the lowering branch has at least one flow-influencing element.

14. The hydraulic system according to claim 1, further comprising at least one pressure-limiting valve arranged parallel to the lowering branch.

15. The hydraulic system according to claim 1, wherein the lowering branch has at least one flow regulator.

16. A vehicle with a hydraulic system according to claim 1.

17. Method for regulating the level of a vehicle having a hydraulic system according to claim 1, in which the vehicle is raised by regulating the pressure source, wherein during raising substantially the same pressure is applied to the pressure source and to the first hydraulic cylinder.

18. The method according to claim 17, comprising a plurality of fluid sources, and further comprising rendering one of the fluid sources ineffective by opening the lowering branch.

* * * * *